July 7, 1953 A. MUSSCHOOT ET AL 2,644,344
DRIVE ARM ASSEMBLY
Original Filed Feb. 4, 1949 4 Sheets-Sheet 4
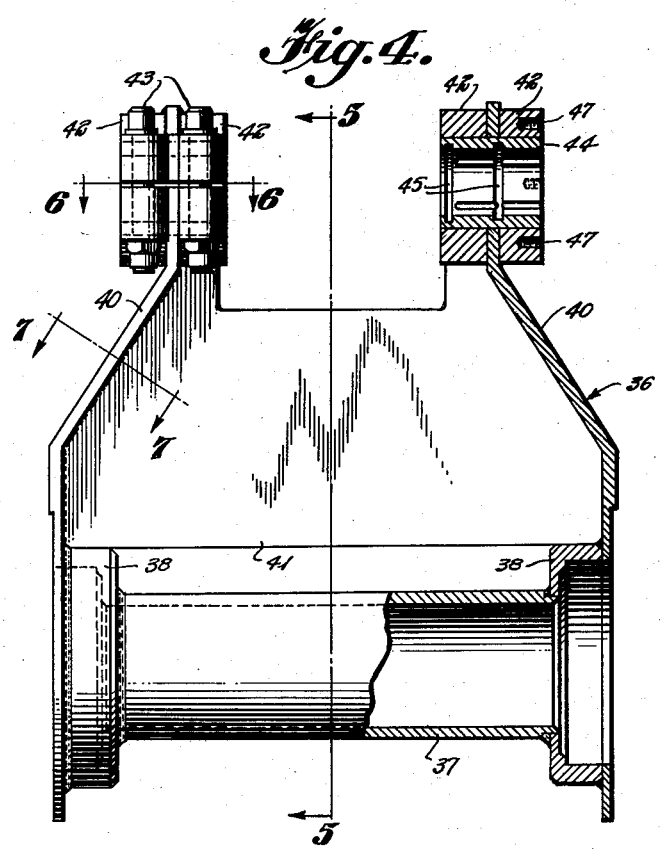
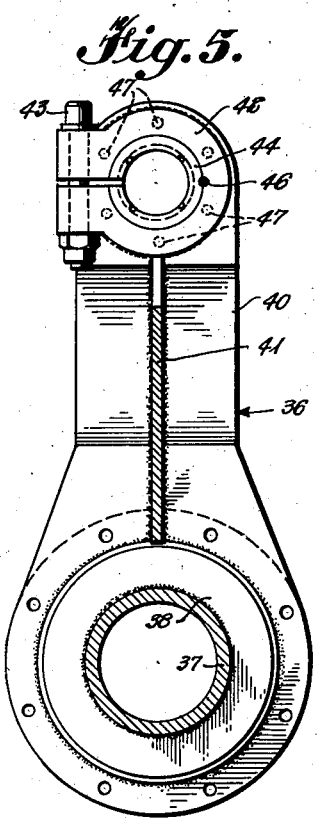
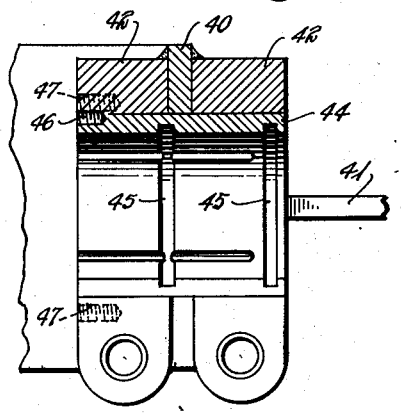
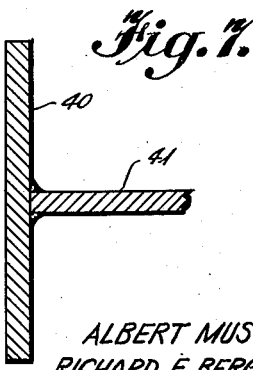
INVENTORS
ALBERT MUSSCHOOT,
RICHARD F. BERGMANN and
CHARLES M. YOUNG, JR.
BY
ATTORNEYS Patented July 7, 1953

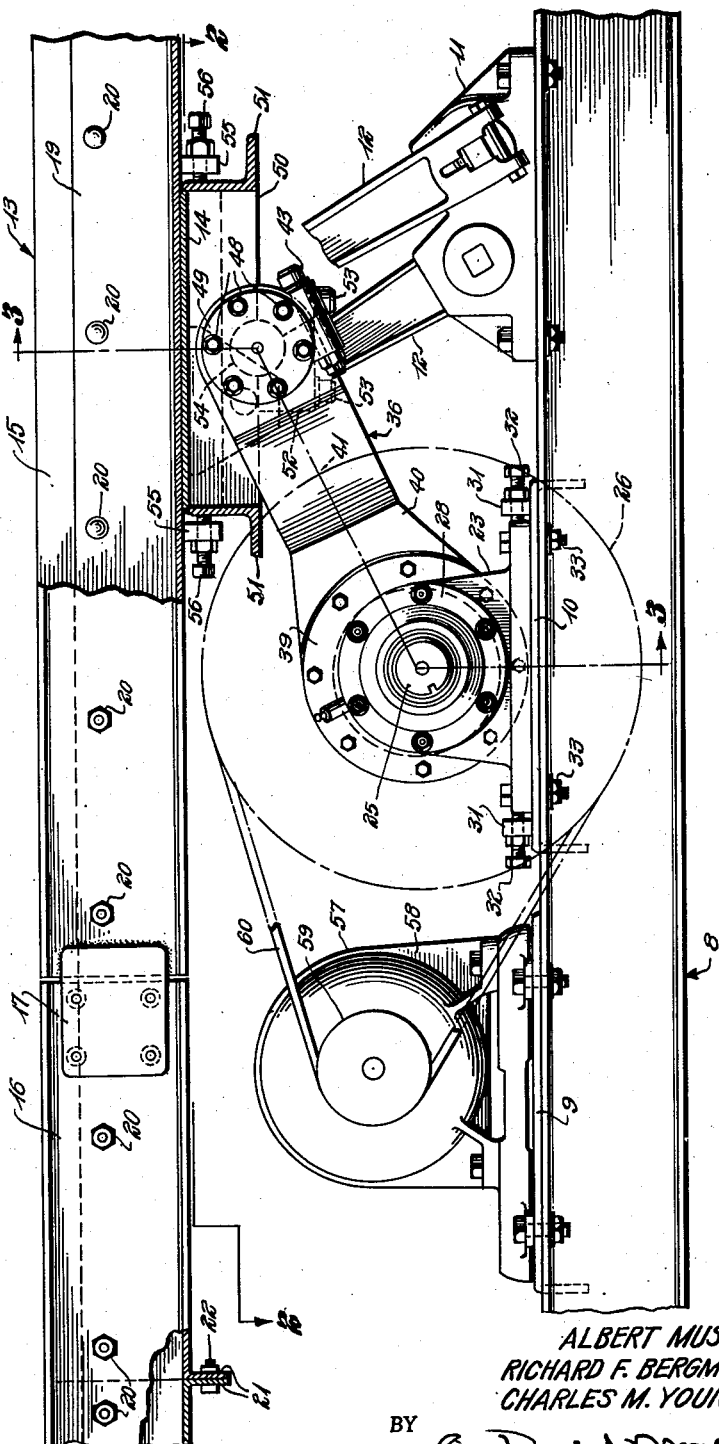

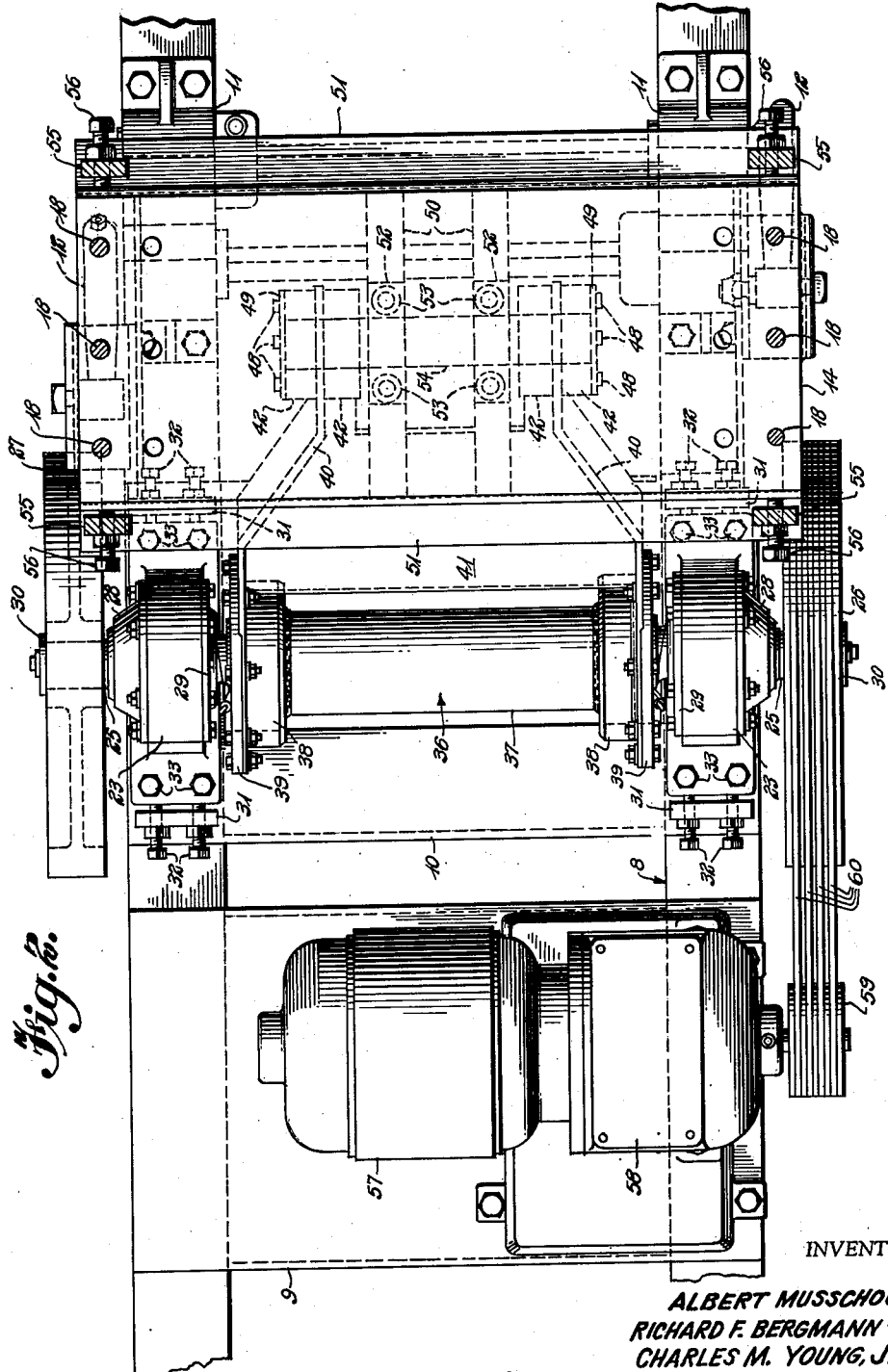

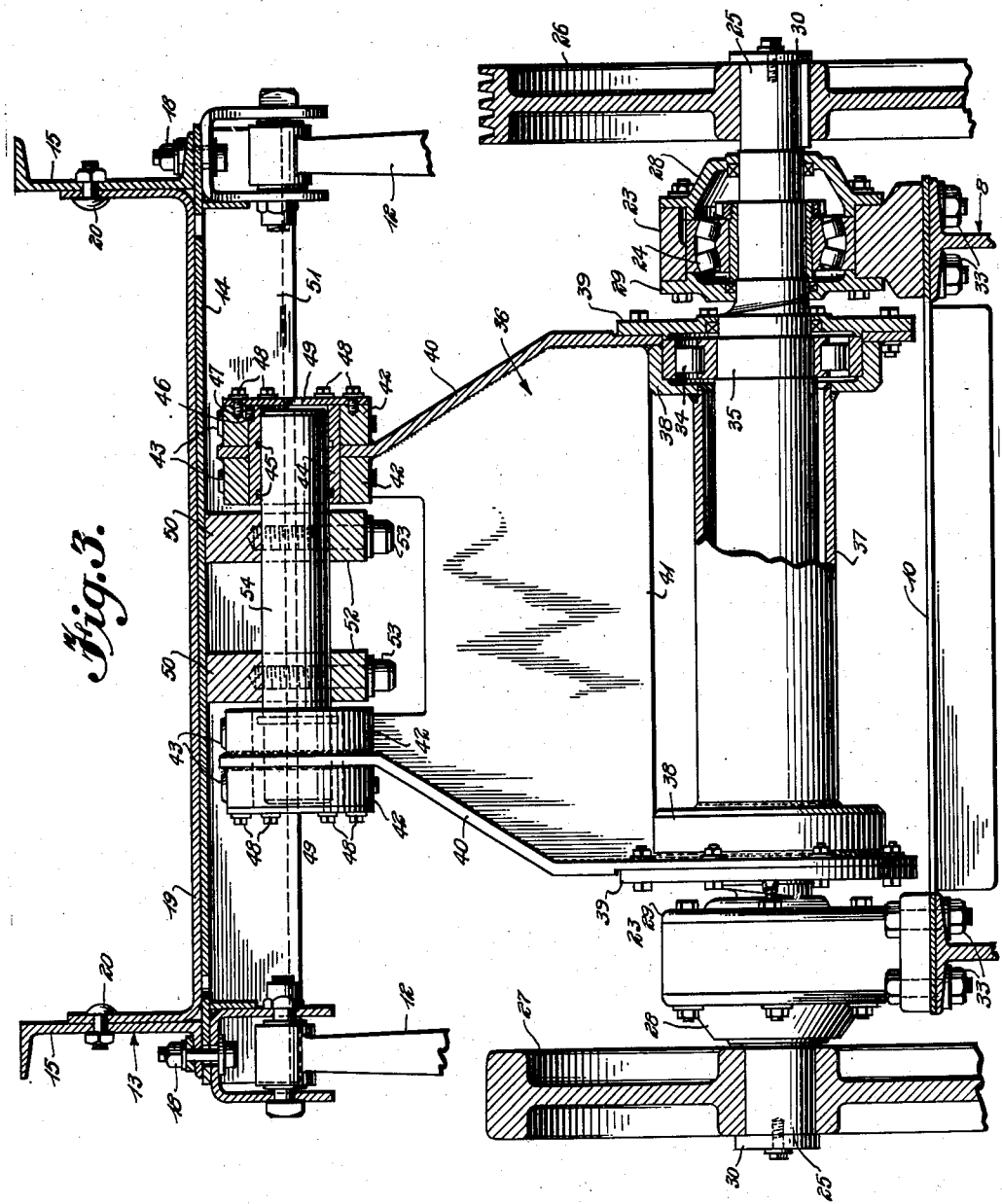

2,644,344

UNITED STATES PATENT OFFICE 2,644,344

DRIVE ARM ASSEMBLY

Albert Musschoot, Park Ridge, Richard F. Bergmann, Winnetka, and Charles M. Young, Jr., Chicago, Ill., assignors to Link-Belt Company, a corporation of Illinois Original application February 4, 1949, Serial No. 74,504. Divided and this application December 6, 1950, Serial No. 199,538

4 Claims. (Cl. 74—588)

This invention relates to new and useful improvements in drive arm assemblies, and deals more specifically with such assemblies adapted for driving oscillating conveyors, feeders and screens. This is a division of the application of Albert Musschoot, Richard F. Bergmann and Charles M. Young, Jr., Serial No. 74,504, filed February 4, 1949, for Positive Drive Oscillating Conveyor.

It has been found in present practice that the frequency of vibration and length of stroke desirable in oscillating devices for conveying, feeding or screening materials are such that conventional drive arm assemblies cannot practically meet the required standards for satisfactory performance. The shock of overcoming the inertia forces of the oscillating body is too great for such assemblies to withstand in any but the relatively small capacity units.

It is the primary object of this invention to provide a drive arm assembly that will absorb the shock or impact stresses developed by the inertia forces in oscillating masses that are driven thereby.

A further object of the invention is to provide a drive arm assembly having a plurality of points adapted for connection to each of the driving and driven devices.

A further object of the invention is to provide a fabricated drive arm which is designed especially for use in the drive mechanism of oscillating conveyors, feeders, or the like.

A further important object of the invention is to provide a drive arm assembly having a plurality of adjustable bearing surfaces for establishing and maintaining a fitted pivotal connection between the assembly and the driven device to prevent relative linear movement therebetween and to eliminate the impact stresses which would result from such movements.

Other objects and advantages of the invention will be apparent during the course of the following description.

In the accompanying drawings, forming a part of this specification, and in which like characters are employed to designate like parts throughout the same, Figure 1 is a side elevational view of the drive arm assembly embodying this invention incorporated in the drive mechanism of an osscillating conveyor, Figure 2 is a horizontal sectional view taken on line 2—2 of Fig. 1, Figure 3 is a vertical sectional view taken on line 3—3 of Fig. 1, Figure 4 is a detail plan view, partly broken away, of the drive arm of the assembly illustrated in Figs. 1, 2 and 3, Figure 5 is a longitudinal sectional view taken on line 5—5 of Fig. 4, Figure 6 is a detail sectional view taken on line 6—6 of Fig. 4, and Figure 7 is a detail sectional view taken on line 7—7 of Fig. 4.

In the drawings, wherein for the purpose of illustration is shown the preferred embodiment of the invention, and first particularly referring to Figs. 1, 2 and 3, the reference character 8 designates the base of an oscillating conveyor. A motor base plate 9 and a drive base plate 10 rest upon and are suitably connected to the tops of the I-beams of the said base 8. The edges of the plates 9 and 10 between the I-beams are flanged downwardly to strengthen the plates.

A plurality of longitudinally spaced housings 11 are connected to the top of the base 8 for mounting the lower ends of the supporting arms 12 which are connected at their upper ends to the oscillative conveyor trough 13.

As illustrated in Figs. 1 and 3, the supporting arms 12 located nearest the drive base plate 10 are pivotally connected to a transverse drive attachment plate 14 of the trough 13. The trough is formed of longitudinally arranged side channel beams 15, which are connected to the drive attachment plate 14 in spaced back-to-back relationship by bolts 18, and additional, alined channel beams 16 connected by tie plates 17 to the channel beams 15. In other words, the channel beams 15 and 16 are arranged to form the two substantially continuous side beams of the trough 13. A trough-shaped pan 19 is positioned between the backs of the channel beams 15 and 16 and is suitably connected thereto by the bolts 20. The pan 19 rests upon but is not connected to the drive attachment plate 14. This pan is formed of any desired number of alined sections and each section is provided at its ends with downwardly flanged portions 21 for connection to the next adjacent sections by the bolts 22.

Referring now to the several figures, and first to Figs. 1, 2 and 3, for a detail description of the driving mechanism for the oscillative trough 13, bearing housings 23 are mounted on the drive base plate 10 to receive the self-alining roller bearings 24 which in turn support the drive shaft 25 near each of its end portions. These shaft portions extend beyond the outer sides of the housings 23 for mounting the drive sheave 26 on one and the flywheel 27 on the other. The outer and inner sides of the housings are closed by the seal plates 28 and 29, respectively. It is noted that the drive sheave 26 and the flywheel 27 are keyed to their respective end portions of the shaft 25 and that plates 30 are employed to prevent accidental disconnection of these elements.

A limited amount of adjustment of the transverse alinement of the bearing housings 23 is provided by the lugs 31 and cap screws 32 associated with the drive base plate 10, see Figs. 1 and 2. This adjustment is made possible by the clearance that is provided for the bolts 33 which mount the bearing housings 23 on the base plate 10.

Roller bearings 34 are mounted on the shaft portions 35 which are eccentric with respect to the axis of rotation of the shaft in the bearings 24. A drive arm 36 is mounted on the middle portion of the drive shaft 25 by the tubular casing 37 which has its enlarged annular ends 38 fitted over the outer races of the roller bearings 34. These enlarged ends 38 are closed outwardly of the bearings 34 by the seal plates 39.

As is illustrated in Figs. 4 through 7, inclusive, the enlarged ends 38 of the driving arm casing 37 are suitably connected to the side flanges 40 which in turn are connected by a web plate 41 extending therebetween. At the outer end portion of the driving arm 36 the side flanges 40 extend beyond the web plate 41 and each have a pair of split clamps 42 welded to opposite sides thereof in concentric relation to a transverse opening formed in the flange. The flanges 40 are split radially in axial alinement with the splits in the clamps 42 so that bolts 43, passed through holes formed in the spaced ends of the clamps, may be tightened to reduce the cross-sectional area of the openings formed in the clamps 42 and the ends of the flanges 40.

A split bushing 44, having oil grooves 45 therein, is inserted into each one of the alined openings formed in the flanges 40 and clamps 42. Set screws 46 are employed to prevent the bushings from turning relative to the clamps. The outer clamp 42 on each side of the drive arm 36 is provided with a plurality of tapped holes 47 for receiving the cap screws 48 to fasten a plate 49 across the opening through the clamp.

Figs. 1, 2 and 3 disclose a pair of parallel plates 50 rigidly connected to the bottom surface of the drive attachment plate 14. Two angle irons 51 are connected to the transverse edges of the drive attachment plate 14 and depend therefrom for connection to the ends of the parallel plates 50. Each of the plates 50 has detachably connected thereto a clamping element 52 by means of the bolts 53 for fastening a connecting pin 54 to the bottom of the drive attachment plate 14. The ends of the connecting pin 54 extend outwardly from the plates 50 and the clamping elements 52, and are received in the bushings 44 at the outer end portions of the driving arm 36. The bushings 44 are contracted around the end portions of the connecting pin 54 by tightening the bolts 43 so that only pivotal movement is permitted between the pin and the drive arm.

Proper positioning of the connecting pin 54 relative to the shaft 25 and its drive arm 36 is provided by the lugs 55 and the cap screws 56 mounted therein, see Figs. 1 and 2. The lugs 55 are suitably fastened on the bottoms of the channel beams 15 and clearance is provided for the bolts 18 which connect the channel beams to the drive attachment plate. Adjustment of the cap screws 56, therefore, will move the drive attachment plate relative to the channel beams 15.

Figs. 1 and 2 show a unitary drive, consisting of a motor 57 and a traction type fluid coupling unit 58, suitably adjustably mounted on the motor base plate 9. A drive sheave 59 is suitably fastened to the shaft of the fluid coupling 58, and V-belts 60 drivingly connect this sheave 59 to the sheave 26.

When the shaft 25 is rotated in its fixed bearings 24, the eccentric portions 35 of the shaft are caused to travel a circular path about the axis of rotation of the shaft. This movement of the portions 35 is transmitted through the bearings 34 to the drive arm 36 to impart oscillatory motion to the conveyor trough 13.

The fluid coupling unit 58 functions to gradually apply the starting torque load to the motor 57. This gradual application of the maximum starting torque reduces the power requirements for the motor 57 and thereby permits the use of a smaller horsepower motor. The fluid coupling unit 58 further acts to prevent the transmission of shock forces from the oscillating and rotating parts through the transmission mechanism and into the motor 57.

The flywheel 27 functions to reduce any fluctuations in the speed of rotation of the drive shaft 25 and to substantially counterbalance the torsional forces transmitted to the drive shaft by the drive arm 36.

It is to be understood that the form of the invention, herewith shown and described, is to be taken as the preferred example of the same, and that various changes in the shape, size and arrangement of parts may be resorted without departing from the spirit of the invention or the scope of the subjoined claims.

Having thus described the invention, we claim:

1. A drive arm assembly, comprising a pair of side flanges each of said side flanges being reversely bent to provide end portions arranged in parallel planes, a web connecting the side flanges with the respective end portions of the side flanges arranged in parallelism and spaced different distances at the opposite ends of the assembly, a tubular casing connected to said web and to the end portions of said flanges which are spaced the greater distance, the end portions of said flanges which are spaced the lesser distance each having a transverse opening therethrough, and two annular members mounted one on each side of each of the last mentioned end portions of said flanges with the openings in said annular members in alinement with the said transverse openings.

2. A drive arm assembly, comprising a pair of side flanges, a web connecting the side flanges, a tubular casing having enlarged annular end portions connected to said web and to the end portions of said side flanges at one end of said assembly, said end portions of the side flanges having openings registering with the enlarged annular end portions of said casing, the end portions of said flanges at the other end of said assembly each having a transverse opening therethrough, and a pair of annular clamping members mounted on each of said flanges on opposite sides thereof with the openings in said annular members in alinement with the said transverse openings in the side flanges.

3. A drive arm assembly, comprising a tubular casing having enlarged annular end portions, an antifriction bearing mounted in each of said end portions, a side flange connected to each enlarged end portion of the casing, said side flanges extending radially from the casing with their outer end portions arranged in spaced parallelism, alined bearing means attached to the said parallel end portions of the side flanges, and a strengthening web extending between and fastened to the enlarged end portions of said casing, the side flanges and the alined bearing means.

4. A drive arm assembly, comprising a drive shaft adapted to be journaled at its end portions in fixed bearings and having an eccentric portion inwardly of and adjacent each journaled end portion, a tubular casing, having enlarged annular end portions, mounted on the drive shaft, antifriction bearings fitted in the enlarged end portions of the tubular casing and on the said eccentric portions of the drive shaft, a side flange connected to each enlarged end portion of the casing, said side flanges extending radially from the casing with their outer end portions arranged in spaced parallelism, alined bearing means attached to the said parallel end portions of the side flanges, a strengthening web extending between and fastened to the casing and the side flanges, and a connecting pin journaled in said alined bearing means.

ALBERT MUSSCHOOT.
     RICHARD F. BERGMANN.
     CHARLES M. YOUNG, Jr.

References Cited in the file of this patent

UNITED STATES PATENTS

| Number | Name | Date |
| --- | --- | --- |
| 1,263,608 | Schaefer | Apr. 23, 1918 |
| 1,355,261 | Pribil | Oct. 12, 1920 |
| 2,120,016 | Bugatti | June 7, 1938 |
| 2,246,438 | Dillon | June 17, 1941 |